(12) United States Patent
Bays et al.

(10) Patent No.: US 6,282,666 B1
(45) Date of Patent: Aug. 28, 2001

(54) COMPUTER PERIPHERAL DEVICE HAVING THE CAPABILITY TO WAKE UP FROM A COLD STATE WITH INFORMATION STORED BEFORE COLD POWERDOWN

(75) Inventors: Laurence Edward Bays, Allentown; Richard Muscavage, Gilbertsville; Dennis A. Brooks, Allentown; Xingdong Dai, Bethlehem; Eric Wilcox, Allentown, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/257,954

(22) Filed: Feb. 26, 1999

(51) Int. Cl.$^7$ .................................................. G06F 12/02
(52) U.S. Cl. ............................................................. 713/323
(58) Field of Search ..................................... 713/300–340

(56) References Cited

U.S. PATENT DOCUMENTS

| | | | |
|---|---|---|---|
| 5,021,983 | * | 6/1991 | Nguyen et al. .................... 713/321 |
| 5,167,024 | * | 11/1992 | Smith et al. . |
| 5,303,171 | * | 4/1994 | Belt et al. ......................... 713/321 |
| 5,339,446 | * | 8/1994 | Yamasaki et al. ..................... 3/33 |
| 5,477,476 | * | 12/1995 | Schanin et al. . |
| 5,517,650 | * | 5/1996 | Bland et al. ...................... 713/323 |
| 5,559,966 | * | 9/1996 | Cho et al. ......................... 710/105 |
| 5,596,756 | * | 1/1997 | O'Brien ............................ 713/340 |
| 5,689,714 | * | 11/1997 | Moyer .............................. 713/310 |
| 5,748,971 | * | 5/1998 | Choi et al. ........................ 713/320 |
| 5,774,736 | * | 6/1998 | Wright et al. .................... 713/330 |
| 5,799,200 | * | 8/1998 | Brant et al. ...................... 713/340 |
| 5,805,910 | * | 9/1998 | Lee et al. ..................... 364/528.21 |
| 6,065,124 | * | 5/2000 | Lee ................................... 713/323 |
| 6,131,127 | * | 10/2000 | Gafken et al. ...................... 710/1 |

OTHER PUBLICATIONS

PCI Special Interest Group, "PCI Bus Power Management Interface Specification, Revision 1.1", Dec. 1998, pp. 1–71.
PCI Special Interest Group, Revision 2.2, PCI Local Bus, Specification Dec. 1998, pp. 1–302.

\* cited by examiner

Primary Examiner—Paul R. Myers
(74) Attorney, Agent, or Firm—William H. Bollman (57) ABSTRACT

A computer peripheral device suitable for operation with a Peripheral Component Interconnect (PCI) Bus or the like, has the ability to "wakeup" the bus from a cold state (e.g., $D3_{cold}$) without the need to supply auxiliary power (e.g., 3.3 volts) to the entire device during the cold state. A modem in the preferred embodiment (although the invention is applicable to other peripheral devices), the device latches device status information from the main circuitry of the device (operating on 5 volts, for example) into a "keep alive" circuit connected to the auxiliary power supply upon the falling edge of a PCI reset signal (RST#). Additionally, the auxiliary power supply also powers a ring detect circuit for the detection of an incoming telephone call, which incoming call triggers a Power Management Event (PME#) signal for changing the state of the bus to an active state. Further, the auxiliary power supply powers a RST# detection circuit for indicating that a change in the power state of the bus is imminent.

24 Claims, 5 Drawing Sheets

COMPUTER PERIPHERAL DEVICE HAVING THE CAPABILITY TO WAKE UP FROM A COLD STATE WITH INFORMATION STORED BEFORE COLD POWERDOWN

BACKGROUND OF THE INVENTION

1. Field of the Invention

The present invention relates generally to power management of computer buses and connected peripheral devices for reduced power consumption. More particularly, the present invention relates to Peripheral Component Interconnect (PCI) bus devices capable of operation before, during and after low power states of an associated PCI bus.

2. Background of Related Art

A computer bus is a set of wires used for data transfer between components of a computer system. Present-day personal computers (PCs), whether in the form of "desktops," "laptops," or "notebooks," use buses optimized for low-cost environments.

A Peripheral Component Interconnect (PCI) bus is a high performance local bus used by many PCs, that provides data paths between the central processing unit (CPU) of the PC and various high speed peripherals. Some peripherals connect to the PCI bus via expansion card slots, and include high-resolution video boards, local area network (LAN) devices, disk controllers, and many others. PCI buses are triple power supply buses (3.3 volts, 5 volts, and −12 volts) which transfer up to 64 bits in parallel at operating speeds of up to 1600 million bytes per second (Mbps), and have either 3.3 volt or 5 volt signaling.

The general specifications and protocols of PCI buses are included in *PCI Local Bus Specification*, Revision 2.2, dated Dec. 18, 1998, and published by the PCI Special Interest Group, Hillsboro, Oreg., U.S.A., the entirety of which is explicitly incorporated herein by reference.

Moreover, many of the general power management specifications needed for operation of PCI buses are detailed in PCI Special Interest Group's *PCI Bus Power Management Interface Specification*, Version 1.1, dated Dec. 18, 1998, the entirety of which is also explicitly incorporated herein by reference.

Present PCs may include multiple PCI buses, each being connected to one or more peripheral devices. Generally, a PCI bus remains in its high power state (3.3 or 5 volts) when there is activity or a need for activity by any of its connected peripheral devices. To conserve power, it is desirable to shut off main power to inactive devices on a PCI bus. This is especially true for PCs operating in a battery-powered mode, since battery life is limited. In addition to transferring data and control information between peripheral devices and central processing units (CPUs), or from one peripheral device to another, PCI buses provide clock signals, and provide main power (3.3 or 5 volts). More recently, PCI buses provide auxiliary power (e.g., 3.3 volt Vaux) to connected peripheral devices.

PCI buses operate at a number of defined power savings levels ranging from maximum powered states (D0) to minimum powered states (D3). The D3 state has two sub-states called $D3_{hot}$ and $D3_{cold}$. The difference between $D3_{cold}$ and $D3_{hot}$ is that devices in the $D3_{cold}$ state have had their main power supply turned off.

In a "cold" state, the PCI bus stops supplying main power to the connected peripheral devices to conserve power, although auxiliary power remains available. When a peripheral device connected to a dormant PCI bus needs to operate, it must cause the PCI to "wakeup" and begin re-supplying the main power.

Some conventional devices handle wake-ups from cold states by keeping the entire peripheral device powered by the auxiliary power. While a lower power consumption results, it is not as low as desirable. Further, since most desktop PCs and peripheral devices are designed to operate from 5 volt power sources (rather than from 3.3voltage sources), additional hardware is required, e.g., in the form of a voltage converter. Alternatively, the peripheral device can be specially designed to operate from a 3.3 volt power source, requiring a 5 volt tolerant buffer/interface. Still further, the peripheral device can use a non-PCI bus power supply such as another battery or side-band power supply to power the circuitry in the cold state necessary to activate a signal on the PCI bus (e.g., PME#) to have main power re-applied, increasing the cost, weight and complexity of operation.

Figure 1:
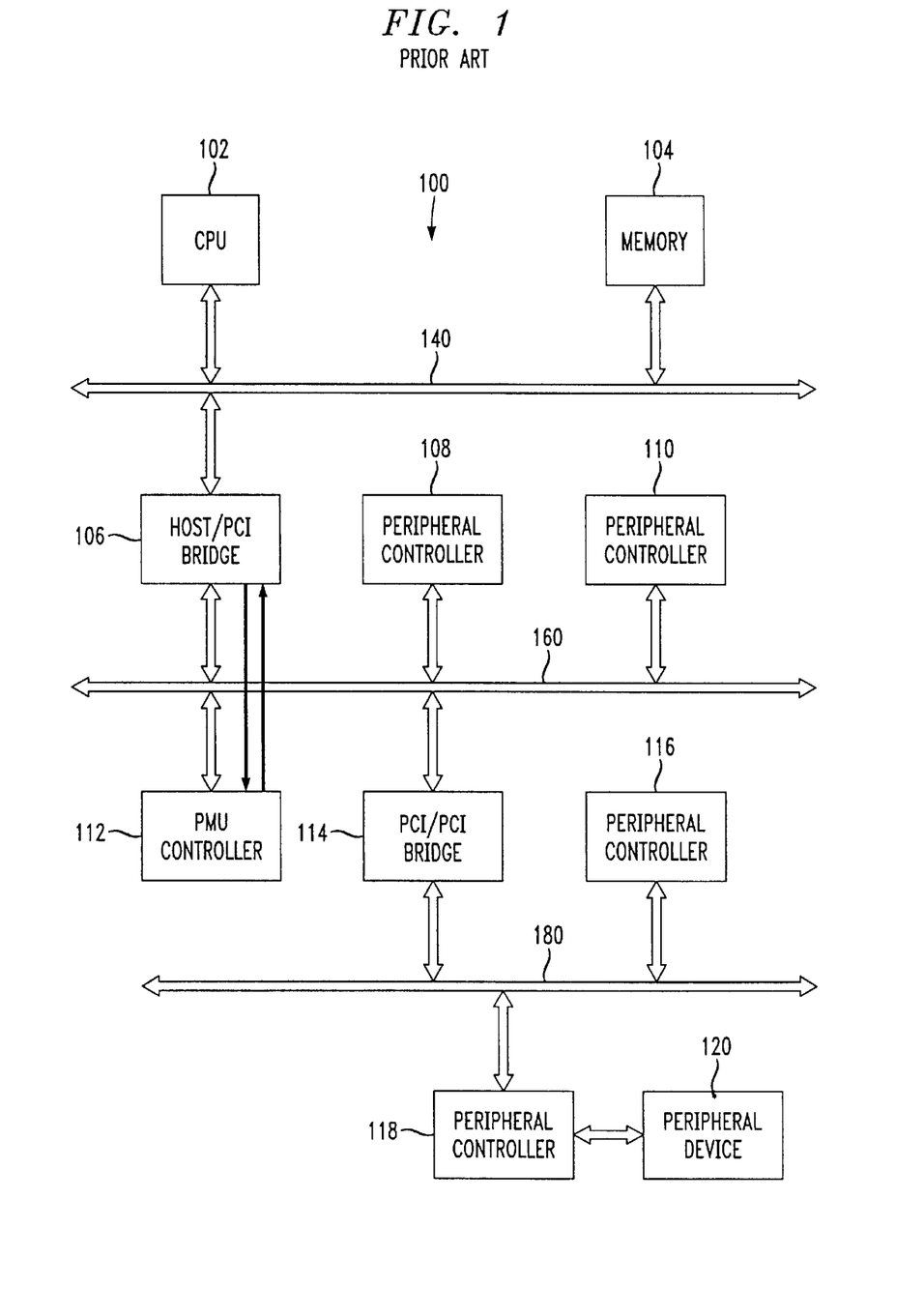
FIG. 1 is a block diagram illustrating a conventional PCI bus structure in a PC system.

FIG. 1 shows an example of a prior art hierarchical bus structure as part of a computer system 100.

The system 100 has a local bus 140 and two PCI buses 160 and 180. It will be appreciated by those skilled in the art that essentially any number of PCI buses can be implemented based on the requirements of the particular application.

The system CPU 102 is connected to the local bus 140 and directly or indirectly performs operations with the other components of the system 100 either via the local bus 142 (such as with the memory 104, which generically represents such common components as DRAMs, cache memory, memory control and the like) or via a bus bridge/controllers 106, 114, connecting to other PCI buses 160, 180.

The PCI buses 160 and 180 are connected in parallel through a bus bridge/controller 114. Additional PCI buses in such a system would also be connected via bus bridge/controllers. Peripherals such as the peripheral device 120 in the system 100 interface with the PCI buses via peripheral controllers (e.g., 108, 110, 116, and 118).

It will be understood by those skilled in the art that many types of connections can be made to the PCI buses, including peripheral devices and memory storage, and even non-PCI buses and local area networks (LANs).

A power management unit (PMU) controller 112 directs PCI power supply control (through clock signals and the like), and implements power conservation algorithms to conserve power when full power is not needed by peripheral devices and PCI buses. PCI bus specifications require a 3.3 volt and/or 5 volt main power supply and define an optional 3.3 volt auxiliary power supply.

In the so-called $D3_{cold}$ state of a PCI bus, main power to the connected peripherals is shut down for maximum bus power efficiency to conserve power consumption. The $D3_{cold}$ state is only indicated where no operation of connected peripheral devices is contemporaneously needed.

There is a need for apparatus and a technique for allowing maximum efficiency in power usage during a low power state such as the D3cold state defined for the PCI bus, while still allowing the low-powered peripheral device to itself request that main power be re-applied.

SUMMARY OF THE INVENTION

In accordance with the principles of the present invention, an auxiliary powered circuit for a peripheral device comprises a bus interface, and a PCI reset signal detector adapted to detect an impending power mode change from a bus connected to the bus interface. Storage, maintained by auxiliary power, is adapted to store information received from a main circuit powered by main power upon detection of the PCI reset signal.

A method of retaining status information in a peripheral device while in a cold power down mode in accordance with another aspect of the present invention comprises powering a main circuit of the peripheral device with main power. An auxiliary circuit on the peripheral device is powered with auxiliary power. Upon detection of an impending power down of the main circuit, status information is transferred from the main circuit to the auxiliary circuit.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a computer peripheral device adapted for operative coupling to a PCI bus and the like. The peripheral device includes a main circuit for carrying out the main tasks of the peripheral device, the main circuit being powered by the main (e.g., 3.3 volts or 5 volt) power supply. The peripheral device also includes an auxiliary circuit powered by an auxiliary power supply (e.g., 3.3 volts).

The device also includes a PCI reset (e.g., RST#) signal detector coupled at least to the auxiliary circuit for detecting a PCI reset signal RST#. When the device is in a $D3_{hot}$ state, a forthcoming change in the power state of the main power to a $D3_{cold}$ state can be indicated to the peripheral device over the bus, including a cessation of the main power supply to the peripheral device.

Upon detection of the PCI reset signal RST# while in $D3_{hot}$, the main circuit latches status information as necessary, e.g., the power mode of the peripheral device, into the auxiliary circuit for maintained storage during a possible $D3_{cold}$ state of the bus. Thus, when the peripheral device is removed from the $D3_{cold}$ state, certain information, e.g., enabled power modes, will still be retained by the peripheral device without requiring another download of the information from the operating system. Upon restoration of the main power supply moving to a D0 state as the reset signal goes high, the auxiliary circuit transfers the previously-latched current status information (e.g., the enabled power mode) back to the main circuit.

The peripheral device further includes a power management event (e.g., PME#) signal generator for generating a PME# signal to request a change in the enabled power mode of the peripheral device connected to the bus.

Figure 2:
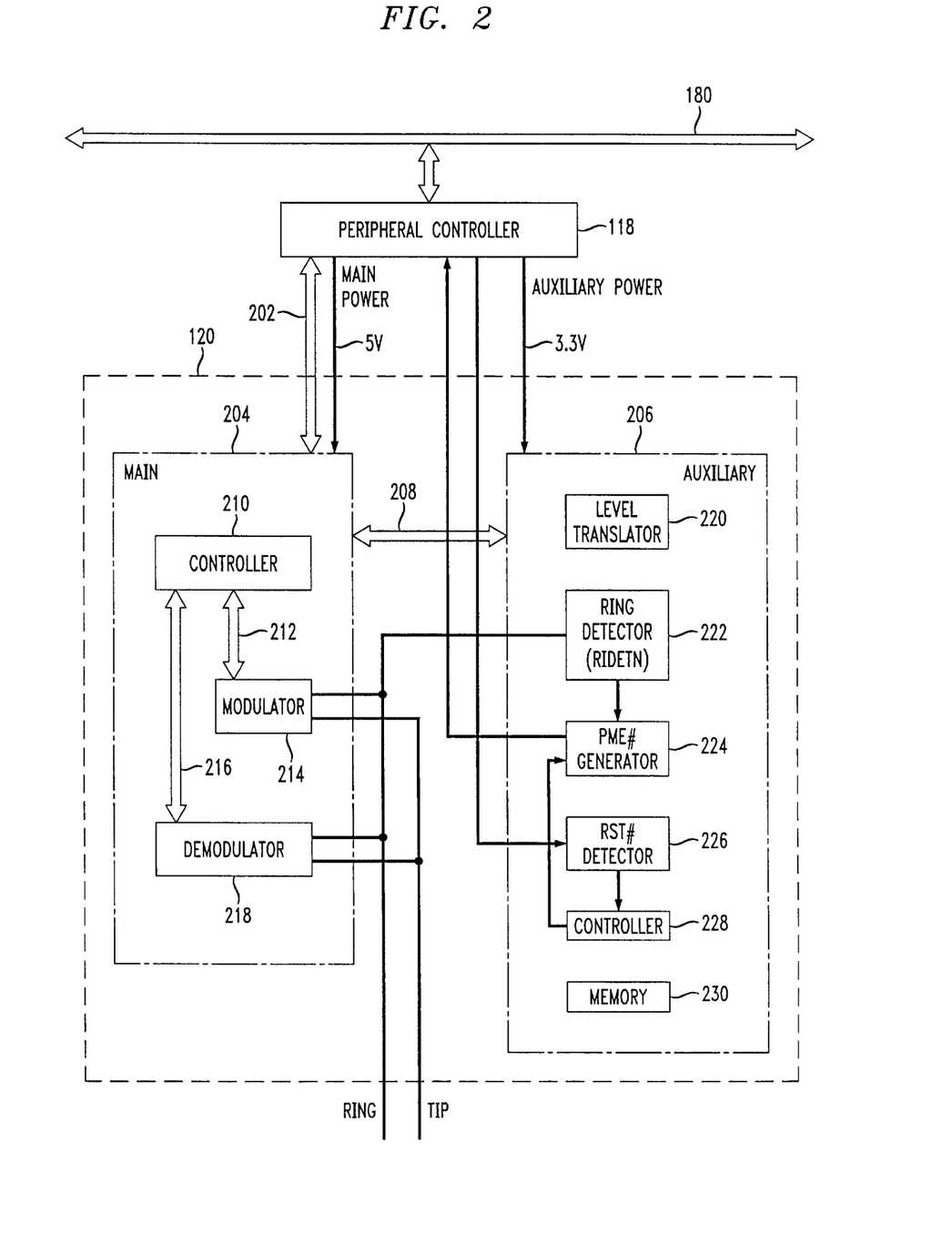
FIG. 2 is a schematic block diagram illustrating a peripheral device including an auxiliary powered circuit capable of storing status information from a main circuit, in accordance with the principles of the present invention.

FIG. 2 is a schematic block diagram of an exemplary peripheral device, e.g., a modem 120, including an auxiliary circuit 206 and a main circuit 204, both in communication with a bus, e.g., a PCI bus 180 through a peripheral controller 118, in accordance with the principles of the present invention.

In particular, the main circuit 204 contains typical circuitry necessary for operation of the peripheral device 120 from main power (e.g., 5 volts) supplied by the PCI bus 180. For instance, in the disclosed embodiment of a modem, relevant features of the main circuit include a controller 210, a modulator 214, and a demodulator 218.

A bus interconnect 202 carries data and control information to and from such components of a computer system as the CPU, for example. The peripheral device 120, as well as the other PCI devices in the system, are connected to the main power supply, e.g., 5 volts, and to an auxiliary power supply, e.g., 3.3 volts.

The auxiliary circuit 206 is powered by auxiliary power and capable of efficient power down operation and of maintaining certain information programmed into the main circuit during power-down into, e.g., a $D3_{cold}$ state.

In accordance with the principles of the present invention, the peripheral device 120 contains a main circuit 204 for carrying out the main functions of the device, and an auxiliary circuit 206 for carrying out auxiliary functions of the device—especially when the main power supply is removed. An internal bus 208 connects the main circuit 204 and the auxiliary circuit 206 and provides data transfer and communication therebetween.

In accordance with PCI bus specifications, the peripheral device 120 also has lines for the transmission of power management event signal PME# in module 224, and PCI reset signal RST# in module 226.

The power management event signal PME# is asserted by a peripheral device when it desires to change its power consumption state, e.g., waking up from a $D3_{cold}$ state. The PCI reset signal RST# is transmitted to the peripheral device 120 from the PCI bus 180 when the power supply begins to go outside its normal operating voltage range, thus indicating an imminent power state change.

In operation, a main power supply (e.g., 5 volts) powers the main circuit 204, while an auxiliary power supply (e.g., 3.3 volts) powers the auxiliary circuit 206.

Being a modem in the disclosed embodiment, the main circuit 204 nominally contains such components as a modulator 214, a demodulator 218, and a controller 210. The controller 210 controls the operation of the main circuit 204, and the movement of information and data between it and the modulator (via bus 212) and the demodulator (via bus 216). The controller 210 also interfaces with the peripheral controller 118 via the bus 202 to move data between the modem and the PCI bus 180. It will be appreciated by those skilled in the art that other well-known components not illustrated, such as for example, buffer memories, digital-to-analog (D/A) converters, and analog-to-digital (A/D) converters, are also included in the modem.

RING and TIP lines of a local telephone loop are connected to the modem 120 as shown to facilitate data transfer in a manner known in the art.

The relevant portion of the auxiliary circuit 206 contains a controller 228 for controlling the operation of the auxiliary circuit 206, memory storage 230 for storing interim information during shutdown of the main power supply, a level translator 220 for translating between 5 volt and 3.3 volt levels, a power management event signal PME# generator 224, a PCI reset signal RST# detector 226 for detecting PCI reset signals RST# from the PCI bus 180, and a ring detector 222 coupled to the telephone line for detecting an incoming ring signal from a telephone company central office. When an incoming ring signal is present, a ring detect signal RIDETN is generated by the ring detector 222.

When in the $D3_{hot}$ state, prior to the commencement of a $D3_{cold}$ state, the PCI bus 180 passes a PCI reset signal RST#. The PCI reset signal detector 226 in the auxiliary circuit 206 is triggered on the falling edge of the transmitted PCI reset signal RST#, and the occurrence of the PCI reset signal RST# is reported to the controller 228 in the auxiliary circuit 206. The controller 228 indicates to the main circuit 204 via bus 208 that a $D3_{cold}$ power state is imminent. In response, the main circuit 204 sends data representing the current status of the peripheral device 120 to the auxiliary circuit 206 for maintained storage using the auxiliary power (e.g., 3.3 volts) utilized by the auxiliary circuit 206 during a $D3_{cold}$ power state. By storing the status information in response to the beginning of a PCI reset signal RST#, information which would otherwise have been lost during the de-powered state of the main circuit 204 will be maintained by the auxiliary power in the auxiliary circuit 206 until the main circuit 204 is again powered-up, i.e., when the peripheral device 120 is removed from the $D3_{cold}$ state. Then, at the beginning of the next power-up cycle, the stored information will be transferred back to the relevant locations in the main circuit 204.

In the disclosed embodiment, the stored information, e.g., status information, is latched into the memory area 230 at the beginning of the PCI reset signal RST#, i.e., on the falling edge of the PCI reset signal RST#, and maintained by the auxiliary power (e.g., 3.3 volts) in the auxiliary circuit 206 while the main circuit 204 remains in a cold state. When main power returns to the main circuit 204, a copy of the status information stored in memory 230 in the auxiliary circuit 206 is sent to the main circuit 204 to allow the peripheral device 120, e.g., the modem, to return to its pre-cold state status without requiring reconfiguration by an external processor over the PCI bus 180.

The main circuit 204 undergoes a wakeup either upon request (e.g., by a CPU on the PCI bus 180 when the user desires to activate the peripheral device 120), or upon the occurrence of another event. For instance, in the case of a modem as in the disclosed embodiment, it would be desirable that the detection of an incoming ring signal by the ring detector 222 in a modem in the $D3_{cold}$ state would itself wakeup the main circuit 204, i.e., cause main power (e.g., 5 volts) to be reapplied to the main circuit 204. Thus, the modem could be placed in the $D3_{cold}$ state to conserve as much power as possible while not in use, and then be powered-up upon detection of an incoming telephone call to the modem.

A power management event signal PME# would be generated by the power management event signal generator 224 in response to the detection of the incoming ring signal by the ring detector 222 to request a power mode change causing the peripheral device 120 to have main power reapplied and thus wakeup from its $D3_{cold}$ state.

According to conventional standards, the power management event signal PME# is either in a logic low state (i.e., active) or in a high impedance state (i.e., inactive).

The PCI reset signal RST# is inactive high (e.g., 5 volts). However, in the preferred embodiment, the PCI reset signal detector 226 includes a logic level translator to change the 5 volt level of the conventional PCI reset signal RST# to the auxiliary voltage (e.g., 3.3 volts) for compatibility with the remainder of the PCI reset signal detector 226 circuitry, which operates using the auxiliary power, which is usually 3.3 volts. Of course, the auxiliary power may be 5.0 volts, in which case the logic level translator is effectively passthrough.

Circuits in the auxiliary circuit 206 which communicate with signaling at main power levels (e.g., at 5 volt levels) preferably include a logic level translator as necessary. For instance, in the disclosed embodiment of a modem, the ring detector circuit 222 also includes a logic level translator for changing 3.3 volt internal signals to 5 volt output signals for compatibility with other components of the modem 120, such as in the main circuit 204.

For instance, in the disclosed embodiment, implementation of the PCI reset signal detection, ring signal detection, and power management event generation each utilizes a pad buffer circuit powered by the auxiliary voltage supply.

Figure 3:
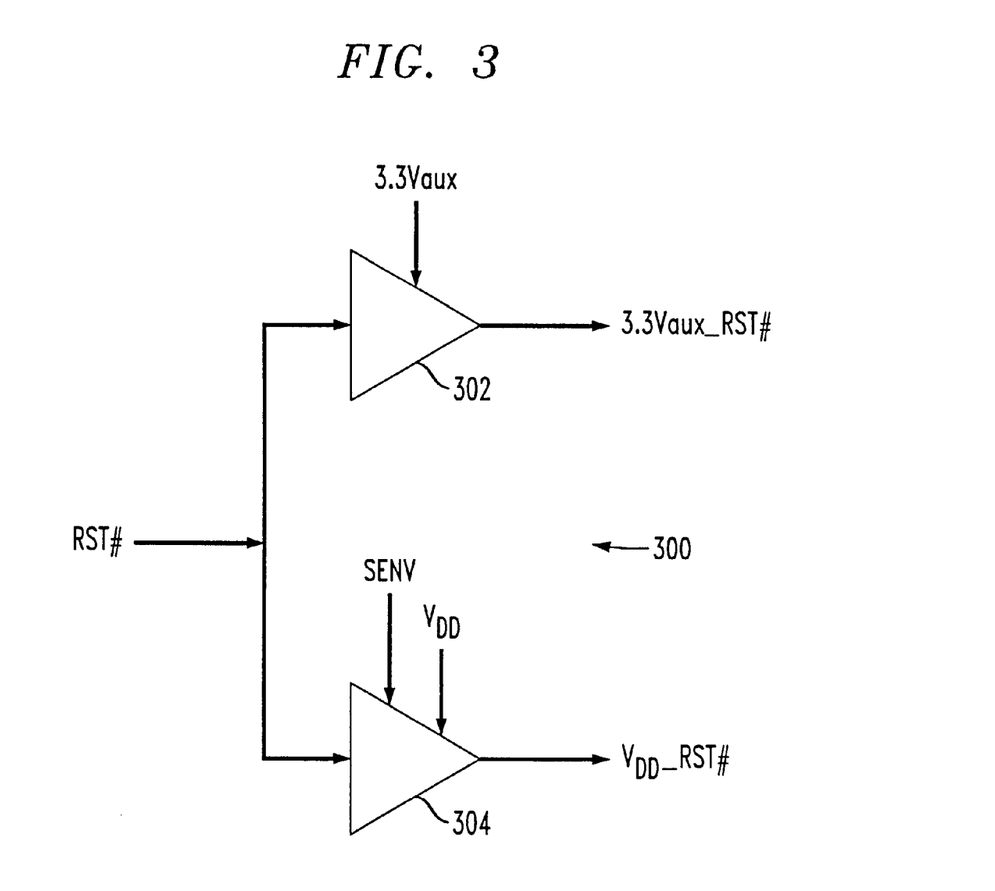
FIG. 3 illustrates an embodiment of a PCI reset detector circuit in the presence of an auxiliary power supply as shown in FIG. 2.

FIG. 3 shows the PCI reset signal (RST#) detector circuit 300, which is a PCI local bus buffer with dual voltage level outputs. A first buffer 302 receives the auxiliary voltage 3.3Vaux, while a second buffer 304 receives the main power supply $V_{DD}$. 3.3Vaux is the 3.3 volt DC auxiliary voltage supply, which is described in the aforementioned *PCI Bus Power Management Interface Specification*, which is explicitly incorporated herein in its entirety. Output 3.3Vaux_RST# from the first buffer 302 varies from ground potential, i.e., $V_{SS}$ to the level of auxiliary power supply voltage 3.3Vaux, while output VDD_RST# from the second buffer 304 varies from ground potential $V_{SS}$ to the level of the main power supply voltage $V_{DD}$.

A select environment control signal SENV allows optimal sensing of the voltage level of the signal RST# input to the second buffer 304. For instance, in the disclosed embodiment, a logic low value of the select environment control signal SENV activates 3.3 volt signaling, e.g., the bus connection is made to a 3.3 volt PCI local bus, while a logic high value of the select environment control signal SENV activates 5 volt signaling, e.g., the bus connection is made to a 5V PCI local bus. Of course, the logic levels of the select environment control signal SENV and any other signals disclosed in the embodiments may be reversed depending upon the particular application with the results.

The PCI reset signal RST# resets the peripheral device. As shown in FIG. 3, the output signal 3.3Vaux_RST# is a 3.3 volt version of PCI reset signal RST#. 3.3Vaux_RST# is powered by 3.3Vaux and is used by the auxiliary wakeup circuit. The output signal VDD_RST# is a 5 volt version of PCI reset signal RST#. VDD_RST# is powered by VDD and is used by 5 volt main circuitry. The dual outputs are desirable to provide a reliable logic low level for the PCI reset signal RST# during $D3_{cold}$ state, particularly since the output signal VDD_RST# will be in a floating state once the main power voltage $V_{DD}$ is removed from the peripheral device 120.

Figure 4:
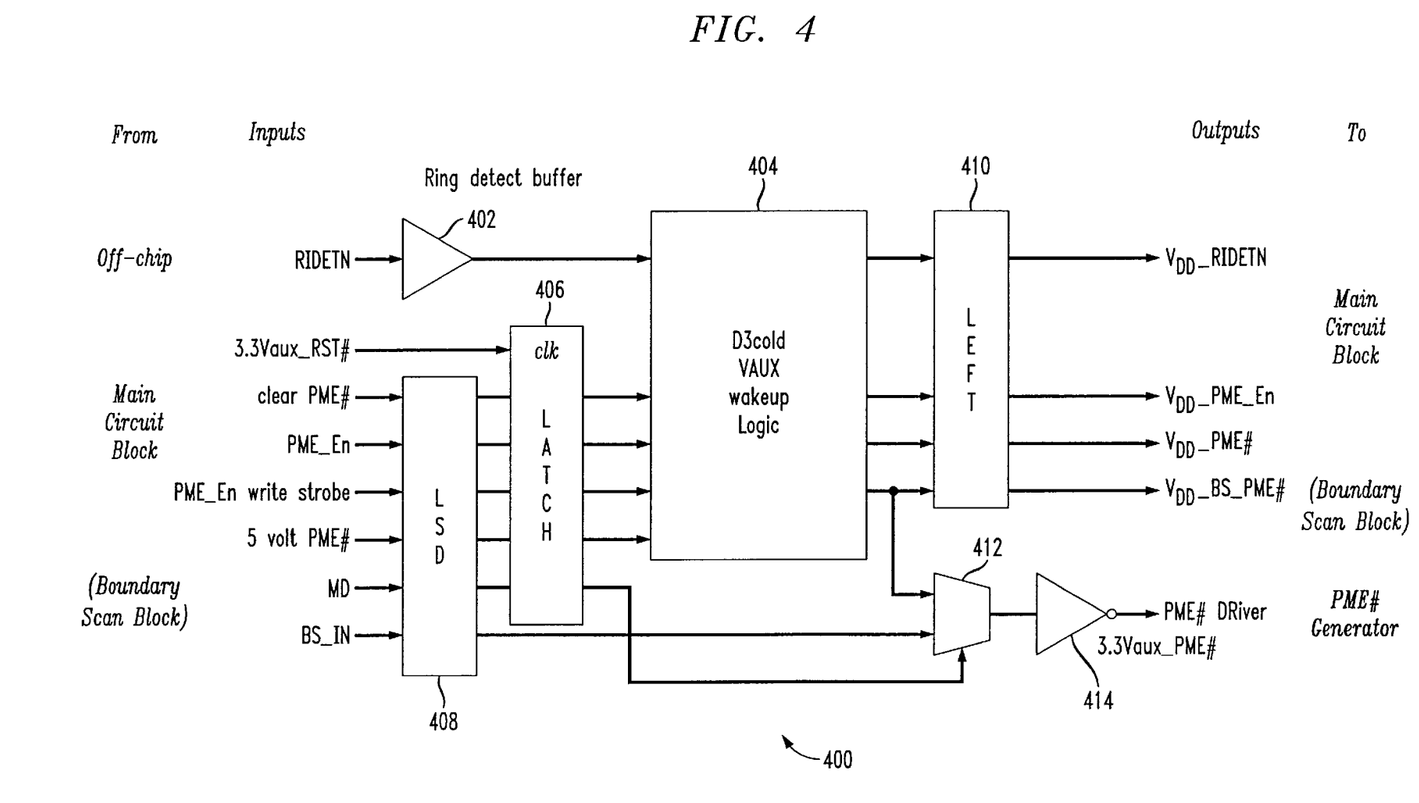
FIG. 4 illustrates an embodiment of a functional circuit for a peripheral device, e.g., a ring detector circuit including a latch for storing status information upon impending power down of a main circuit, in accordance with the principles of the present invention.

FIG. 4 shows an embodiment of a ring detector circuit 400 in accordance with the principles of the present invention.

In particular, the relevant components of the ring detector buffer circuit 400 include a buffer 402, a wakeup logic circuit 404, a latch 406, a voltage down-shifter (LSD) 408, a voltage up-shifter (LEFT) 410, a PME# boundary-scan multiplexer 412, and an inverting driver 414.

The voltage down-shifter 408, latch 406, and voltage up-shifter 410 act as an interface to isolate 3.3 volt circuitry (e.g., in the auxiliary voltage 3.3Vaux powered auxiliary circuit 206 shown in FIG. 2) from 5 volt circuitry (e.g., in the $V_{DD}$-powered main circuitry 204 shown in FIG. 2).

A latch 406, upon the assertion of PCI reset signal, is to latch or store status and/or other information received from the main circuit 204 at its inputs from the main circuit. The 3.3Vaux_RST# signal from the PCI reset detector 300 provides a clocking or latching signal to the latch 406. Of course, any information may be latched in a suitably sized latch. The disclosed embodiment shows latched or stored status information such as: PME_En signal; 5 volt PME# signal; PME_En write strobe signal; clear PME# signal; and MD signal.

The PME_En signal is one of many power management event (PME) context bits that are "required to generate power management events (PMEs), report PME status, and enable PMEs", all of which are described in the aforementioned *PCI Bus Power Management Interface Specification*. PME_En is defined in bit 8 of a 16-bit Power Management Control/Status Register (PMCSR).

The 5 volt PME# signal is one possible source of PME_Status which is also a PME context bit. PME_Status is defined in bit 15 of the PMCSR.

The PME_En write strobe signal and clear PME# signal are device specific control signals related to PME.

The MD signal is a mode control signal in boundary-scan for device testing and diagnosis.

The disclosed embodiment of FIG. 4 also illustrates two input signals which are not latched, RIDETN and BS_IN. RIDETN is a ring detect input signal, and BS_IN is the boundary-scan input from a previous boundary-scan cell.

The disclosed embodiment of FIG. 4 provides four outputs to the main circuitry 204 of FIG. 2 such as: VDD_RIDETN; VDD_PME_En; VDD_BS_PME#; and VDD_PME#, and one output 3.3Vaux_PME# to the PME# generator 224 (also shown in FIG. 2). VDD_RIDETN is a buffered ring detect signal. VDD_PME_En is a latched PME_En signal (bit 8 of PMCSR as described before). VDD_BS_PME# is a boundary-scan output signal for PME#. VDD_PME# is a PME# signal at VDD strength (e.g., 5 volts). 3.3Vaux_PME# is a PME# signal at 3.3Vaux strength (e.g., 3.3 volts).

Figure 5:
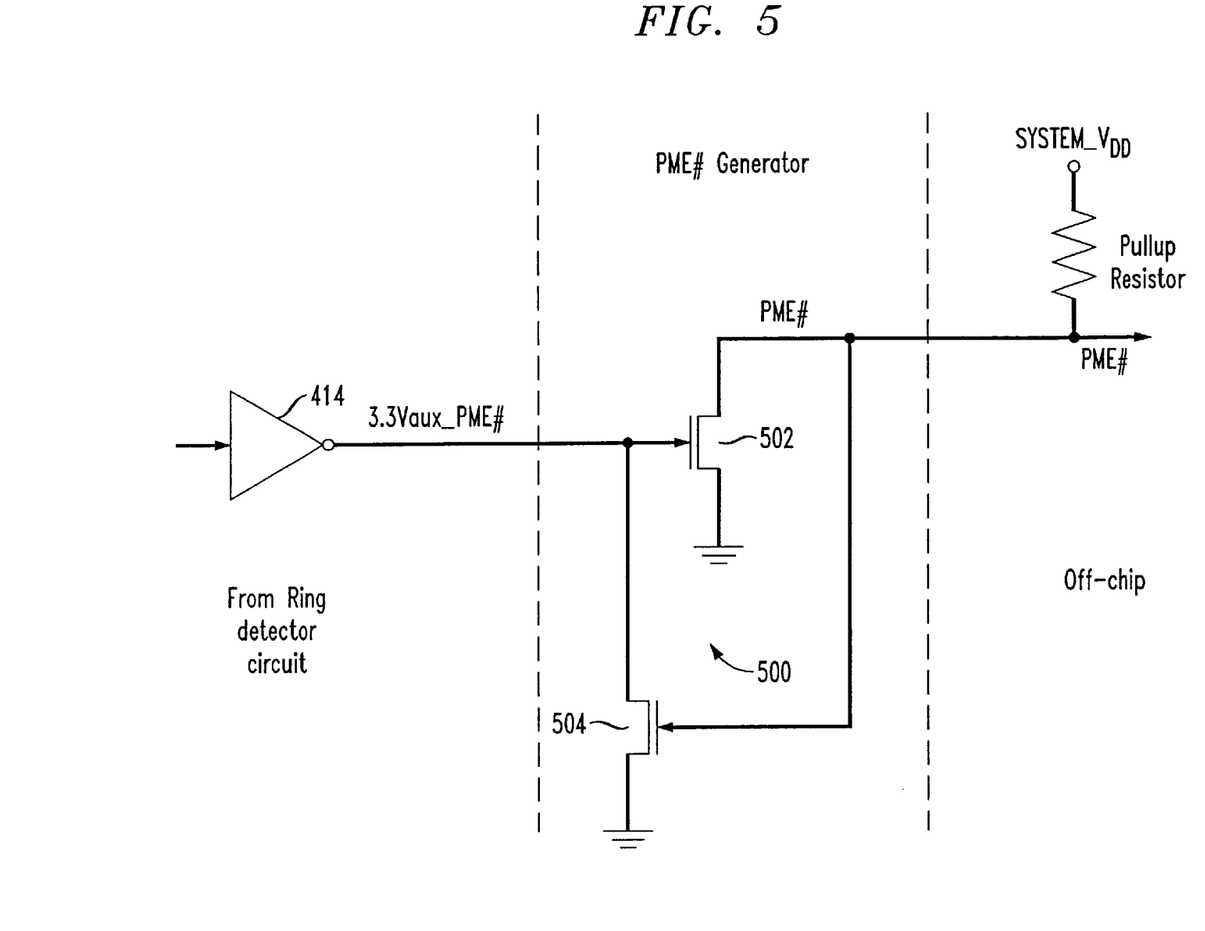
FIG. 5 illustrates a power management event signal generator circuit which generates a power management event signal in response, e.g., to an incoming control signal from the functional circuit of FIG. 4 based on the auxiliary power supply, in accordance with the principles of the present invention.

In accordance with the principles of the present invention, FIG. 5 shows an exemplary pad buffer 500 of the power management event generator 224 and its associated off-chip connections to system power supply SYSTEM_VDD through a pull-up resistor.

In particular, the buffer circuit 500 includes an input 3.3Vaux_PME# to an open-drain field effect transistor (FET) 502, and a weak feedback FET 504. The weak Feedback FET 504 has two functions. The first is to guard against possible erroneous power management event PME# output as a result of floating input, and thereby allowing the power management event signal PME# output to be driven high to the system power rail level. The input 3.3Vaux_PME# signal to the buffer circuit 500 could float when 3.3Vaux is disconnected from the device. The second function is to serve as an extra pull-down device on the input 3.3Vaux_PME# to hasten output transitions of the power management event signal PME# from logic low to logic high levels.

Thus, a novel PCI bus peripheral device with efficient power consumption characteristics and cold state wakeup of the bus has been provided, obviating the need to apply auxiliary power to the entire peripheral device during the $D3_{cold}$ state to maintain status or other operational information.

Although the peripheral device 120 described herein relates to a modem (modulator-demodulator) used to transfer digital information over telephone lines, it will be appreciated by those skilled in the art that the peripheral device employing the present invention need not be limited to modems, but may be any PCI-compatible peripheral device.

While the invention has been described with reference to the exemplary embodiments thereof, those skilled in the art will be able to make various modifications to the described embodiments of the invention without departing from the true spirit and scope of the invention.

What is claimed is:

1. An auxiliary powered circuit for a peripheral device, comprising:
   a bus interface;
   a PCI reset signal detector adapted to detect an impending power mode change from a bus connected to said bus interface; and
   storage, maintained by auxiliary power, and adapted to store information received from a main circuit powered by main power upon detection of said PCI reset signal.

2. The auxiliary powered circuit for a peripheral device according to claim 1, wherein:
   said information is status information.

3. The auxiliary powered circuit for a peripheral device according to claim 1, further comprising:
   a power mode event signal generator adapted to output a power mode event signal requesting a power mode change for said main circuit of said peripheral device.

4. The auxiliary powered circuit for a peripheral device according to claim 3, wherein:
   said power mode event signal generator outputs said power mode event signal upon removal of said peripheral device from a cold power down state.

5. The auxiliary powered circuit for a peripheral device according to claim 4, wherein:
   said cold power down state is a D3cold state.

6. The auxiliary powered circuit for a peripheral device according to claim 3, wherein:
   said power mode event signal generator outputs said power mode event signal upon receipt of a ring detect signal.

7. The auxiliary powered circuit for a peripheral device according to claim 1, wherein said PCI reset signal detector comprises:
   a logic level translator to allow said PCI reset signal detector to be activated by a logic signal having a voltage above a level of said auxiliary power.

8. The auxiliary powered circuit for a peripheral device according to claim 1, wherein said storage comprises:
   a latch receiving input signals from said main circuit.

9. The auxiliary powered circuit for a peripheral device according to claim 8, wherein:
   said latch is clocked by a first edge of said PCI reset signal.

10. The auxiliary powered circuit for a peripheral device according to claim 9, wherein:
    said first edge of said PCI reset signal is a rising edge.

11. The auxiliary powered circuit for a peripheral device according to claim 1, wherein:

said impending power mode change is a removal of main power from said main circuit interfaced with said auxiliary powered circuit.

12. The auxiliary powered circuit for a peripheral device according to claim 1, wherein:

said bus interface is a PCI bus interface.

13. The auxiliary powered circuit for a peripheral device according to claim 1, wherein:

said peripheral device is a modem.

14. A method of retaining status information in a peripheral device while in a cold power down mode, said method comprising:

powering a main circuit of said peripheral device with main power;

powering an auxiliary circuit on said peripheral device with auxiliary power; and upon detection of an impending power down of said main circuit, transferring status information from said main circuit to said auxiliary circuit.

15. The method of retaining status information in a peripheral device while in a cold power down mode according to claim 14, wherein:

said detection of said impending power down is based on detection of a PCI reset signal.

16. The method of retaining status information in a peripheral device while in a cold power down mode according to claim 15, wherein:

said detection relates to an occurrence of a first edge of said PCI reset signal.

17. The method of retaining status information in a peripheral device while in a cold power down mode according to claim 16, wherein:

said first edge is a rising edge.

18. The method of retaining status information in a peripheral device while in a cold power down mode according to claim 14, further comprising:

interfacing said peripheral device with a PCI bus.

19. The method of retaining status information in a peripheral device while in a cold power down mode according to claim 14, further comprising:

transferring said status information from said auxiliary circuit back to said main circuit upon power up of said main circuit.

20. Apparatus for retaining status information in a peripheral device while in a cold power down mode, comprising:

means for powering a main circuit of said peripheral device with main power;

means for powering an auxiliary circuit on said peripheral device with auxiliary power; and means for transferring status information from said main circuit to said auxiliary circuit upon detection of an impending power down of said main circuit wherein said detection of said impeding power down is based on detection of a PCI reset signal.

21. The apparatus for retaining status information in a peripheral device while in a cold power down mode according to claim 20, wherein:

said detection relates to an occurrence of a first edge of said PCI reset signal.

22. The apparatus for retaining status information in a peripheral device while in a cold power down mode according to claim 21, wherein:

said first edge is a rising edge.

23. The apparatus for retaining status information in a peripheral device while in a cold power down mode according to claim 20, further comprising:

means for interfacing said peripheral device with a PCI bus.

24. The apparatus for retaining status information in a peripheral device while in a cold power down mode according to claim 20, further comprising:

means for transferring said status information from said auxiliary circuit back to said main circuit upon power up of said main circuit.

* * * * *